United States Patent [19]

Boyd, Jr. et al.

[11] 4,116,410
[45] Sep. 26, 1978

[54] ADAPTABLE RESILIENT MOTOR MOUNTING

[75] Inventors: John H. Boyd, Jr.; Don C. Nelson, Jr., both of Fort Wayne, Ind.

[73] Assignee: General Electric Company, Fort Wayne, Ind.

[21] Appl. No.: 800,418

[22] Filed: May 25, 1977

[51] Int. Cl.² .......................................... F16M 13/00
[52] U.S. Cl. ....................................... 248/26; 310/91
[58] Field of Search ...................... 248/26, 7, 15, 16; 310/91; 29/401 F

[56] References Cited

U.S. PATENT DOCUMENTS

| | | | |
|---|---|---|---|
| 2,740,073 | 3/1956 | Wightman | 248/26 |
| 2,803,416 | 8/1957 | Berlien | 248/26 |
| 3,235,207 | 2/1966 | Church | 248/26 |
| 3,235,653 | 2/1966 | Ostrognai | 248/26 X |
| 3,516,627 | 6/1970 | Gable et al. | 248/26 |
| 3,573,510 | 3/1971 | Otto | 248/26 |
| 3,721,411 | 3/1973 | Cunningham | 248/26 |
| 3,750,267 | 8/1973 | Otto | 248/26 |
| 3,787,014 | 1/1974 | Story et al. | 248/26 |
| 3,858,067 | 12/1974 | Otto | 248/26 |

OTHER PUBLICATIONS

General Electric Publication No. 723-42, May 15, 1961.
General Electric Bulletin No. GEZ-3156(p.3), Mar., 1961.
General Electric Bulletin No. GEC-1041B-Dec. 1960.

Primary Examiner—J. Franklin Foss
Attorney, Agent, or Firm—Ralph E. Krisher, Jr.

[57] ABSTRACT

Method and apparatus for supporting a motor having cradle engageable rings at opposite ends thereof in the arms of a selected one of a plurality of different size support or cradle bases is disclosed wherein the motor has at least one end shield with an axially extending hub and a resilient mounting ring embracing that hub and movable axially therealong. A support base has a cradle portion for engaging the mounting ring to support the hub and a clamp arrangement for securing the ring to the cradle portion. The opposite motor end may have a similar axially extending hub on the opposite motor end shield embraced by another mounting ring clampable in a second similar cradle portion. To adapt the mounting arrangement to a selected cradle base, a cradle engaging mounting ring is slid axially along the motor hub until the separation between the rings is appropriate for positioning the motor adjacent to the base with the rings in registry with corresponding base cradle portions whereupon the base and rings are engaged and the rings secured, for example by clamping to the respective base cradle portion. Annular adapters may additionally be provided to conform the radius of a ring to the radius of curvature of the particular ring engaging cradle portion. A motor mounting arrangement adaptable to various size cradle bases is thereby provided.

19 Claims, 3 Drawing Figures

ADAPTABLE RESILIENT MOTOR MOUNTING

BACKGROUND OF THE INVENTION

This invention relates generally to mounting arrangements for rotating machines and more particularly to a resilient mounting arrangement adaptable to varying size bases and therefore particularly suited for an aftermarket or replacement motor mounting arrangement.

A commonly used resilient mounting arrangement for rotating machines, such as fractional horsepower motors, utilizes a pair of cushion rings disposed on hubs at opposite ends of the motor and engageable with corresponding cradle portions of a U-shaped cradle base with the rings being clamped to the pertaining cradle portions or arms of the base. The resilient rings themselves may be toroidal in form or may be axially slotted, fluted or otherwise irregularly configured around their inner or outer periphery to prevent rotation of the machine relative to the mounting base, for example due to starting torque of the machine. Regardless of the peripheral configuration of the mounting rings, such rings are typically located in a fixed axial position for engagement with the arms of the associated machine mounting brackets.

In the fractional horsepower motor industry there is little uniformity in the dimensions of the cradle bases and motor replacement frequently requires replacement of the cradle base along with the motor or extensive stocking or searching for an appropriate replacement motor to fit the existing base.

One approach to providing a replacement motor to fit a number of different size cradle bases has been to provide motor through-bolts of a length in excess of that required to pass from one end shield to the other and to clamp, for example, between a pair of nuts on each such extended through-bolt, a bracket arrangement for supporting a resilient mounting ring. Such a bracket and ring might be complementarily contoured to prevent relative rotation, however, the axial position of the mounting ring relative to the bracket is fixed and to adjust the bracket to suit a particular cradle base requires the loosening and retightening of pairs of nuts on each through-bolt. The adapting of such an arrangement to a particular cradle base is therefore somewhat time consuming and the structure itself adds to the cost of the motor.

Due to the variations mainly in axial length of such motors, replacement motors are frequently sold with a U-shaped cradle base attached thereto and the provision of a replacement motor easily adapted to a variety of existing bases would eliminate the base cost from the cost of the replacement motor as well as easing the burden of removing the old base and installing the new base at the time of replacement.

SUMMARY OF THE INVENTION

Among the several objects of this invention may be noted the provision of a method of readily adapting a replacement motor to a selected one of a plurality of different size bases; the provision of a replacement motor not requiring a new mounting base; the provision of a resilient mounting arrangement having first and second hub embracing annuli, at least one of which is axially movable to accommodate different machine mounting brackets; the provision of an aftermarket motor characterized by its economy of manufacture, and ease of installation; and the provision of a unique end shield which facilitates adapting a replacement motor to existing cradle bases.

In general and in one form of the invention, a resiliently mounted motor has an end shield with an axially extending hub and a mounting ring embracing that hub and movable axially therealong to a preferred position for engaging a cradle portion of a support base. The ring is then secured to that cradle portion and the motor otherwise connected to the support base for fixing the relative axial position of the ring and hub at the preferred location and precluding further axial motion therebetween.

Also in general, an electrical motor has an axially extending hub and a ring embracing that hub with the ring and hub including mating portions for allowing axial movement of the ring on the hub while preventing relative rotation therebetween. A support base with a cradle portion is provided for engaging the ring to support the hub including means for securing the ring to the cradle portion.

Further in general and in one form of the invention, a method of supporting a motor having cradle engageable rings at opposite ends thereof, in the arms of a selected one of a plurality of different size cradle bases, includes sliding at least one of the rings axially along the motor hub until the separation between the rings is appropriate for positioning the motor with the rings in registry with corresponding base arms, whereupon the base arms and corresponding rings are engaged and respectively secured.

BRIEF DESCRIPTION OF THE DRAWING

Corresponding reference characters indicate corresponding parts throughout the several views of the drawing.

The exemplification set out herein illustrates an embodiment of the invention in one form thereof and such exemplification is not to be construed as limiting in any manner the scope of the invention.

DESCRIPTION OF THE PREFERRED EMBODIMENT

Figure 1:
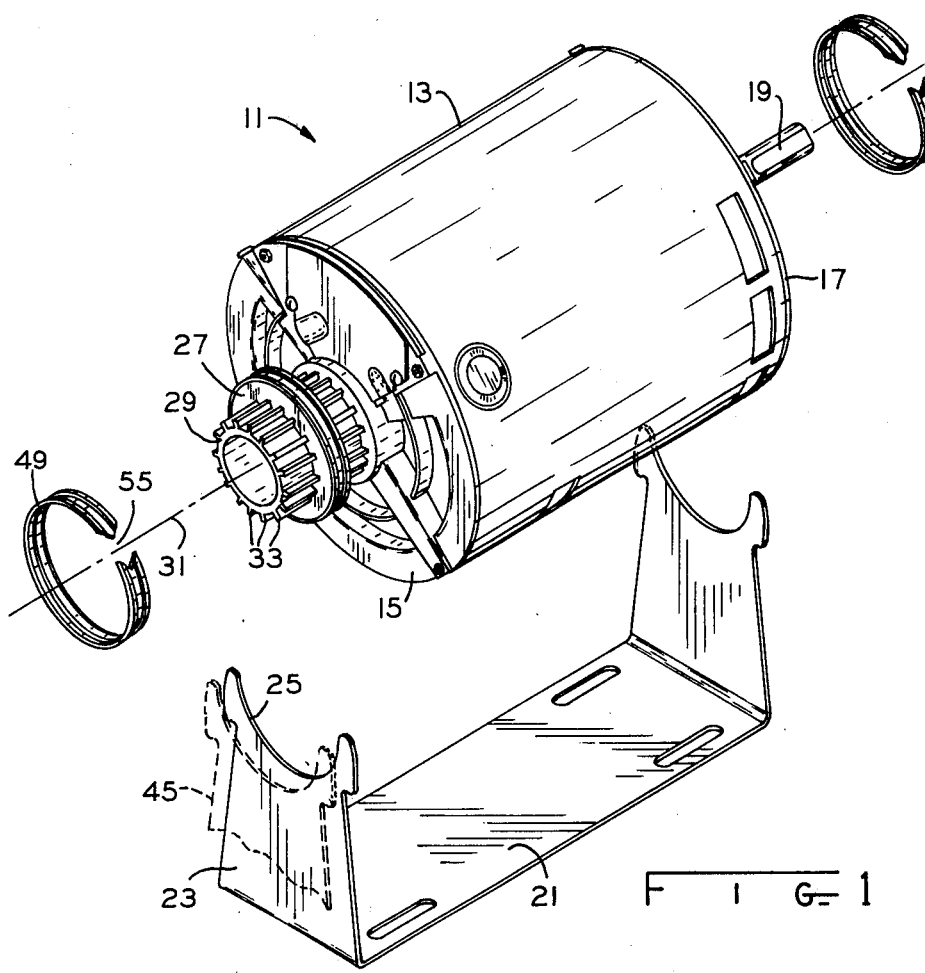
FIG. 1 is a perspective view of a cradle base supported motor according to the present invention.

Referring now to the drawing and more particularly to the perspective view of FIG. 1, an electric motor or other rotating machine 11 has a housing or frame including a generally cylindrical shell or sleeve 13, having end shields 15 and 17 at opposite ends thereof. The motor housing may, for example, include a conventional stator and rotor with the rotor journaled in bearings within the end shields 15 and 17 and having an axially extending shaft 19 for coupling to pulleys, fans and the like. The end structures or shields 15 and 17 may for example be die cast aluminum alloy structures which are connected to the opposed ends of the sleeve 13 by through-bolts or otherwise as is conventional in motor construction. A mounting bracket 21 supports the motor frame and may for example be a cradle base type mounting arrangement having an arm 23, the extremity 25 of which is contoured to mate with mounting member 27. The opposite end of the motor may of course be similarly supported.

The frame of the motor 11 has an axially extending hub 29 generally coaxial with the motor rotor axis 31 and extending a substantial distance therealong. The resilient mounting member or cushion ring 27 embraces the hub 29 and the ring and hub include mating portions such as the axially extending projections or splines 33 which mate with corresponding axially extending grooves in the annular ring 27 so as to allow axial movement of the ring 27 on the hub while preventing relative rotation between the ring and hub. The arm 23 of the support base of course engages the ring 27 to support the hub and the ring 27 is secured to the cradle base by a clamping arrangement 35.

As thus far described the hub 29 is still free to move axially within the ring 27 and completion of the mounting desirably includes some further connection between the motor frame and the support base to preclude further relative axial movement between the ring and hub. This may be accomplished by a second similar ring on the axially extending hub of end shield 17 as more clearly depicted in FIG. 2.

Figure 2:
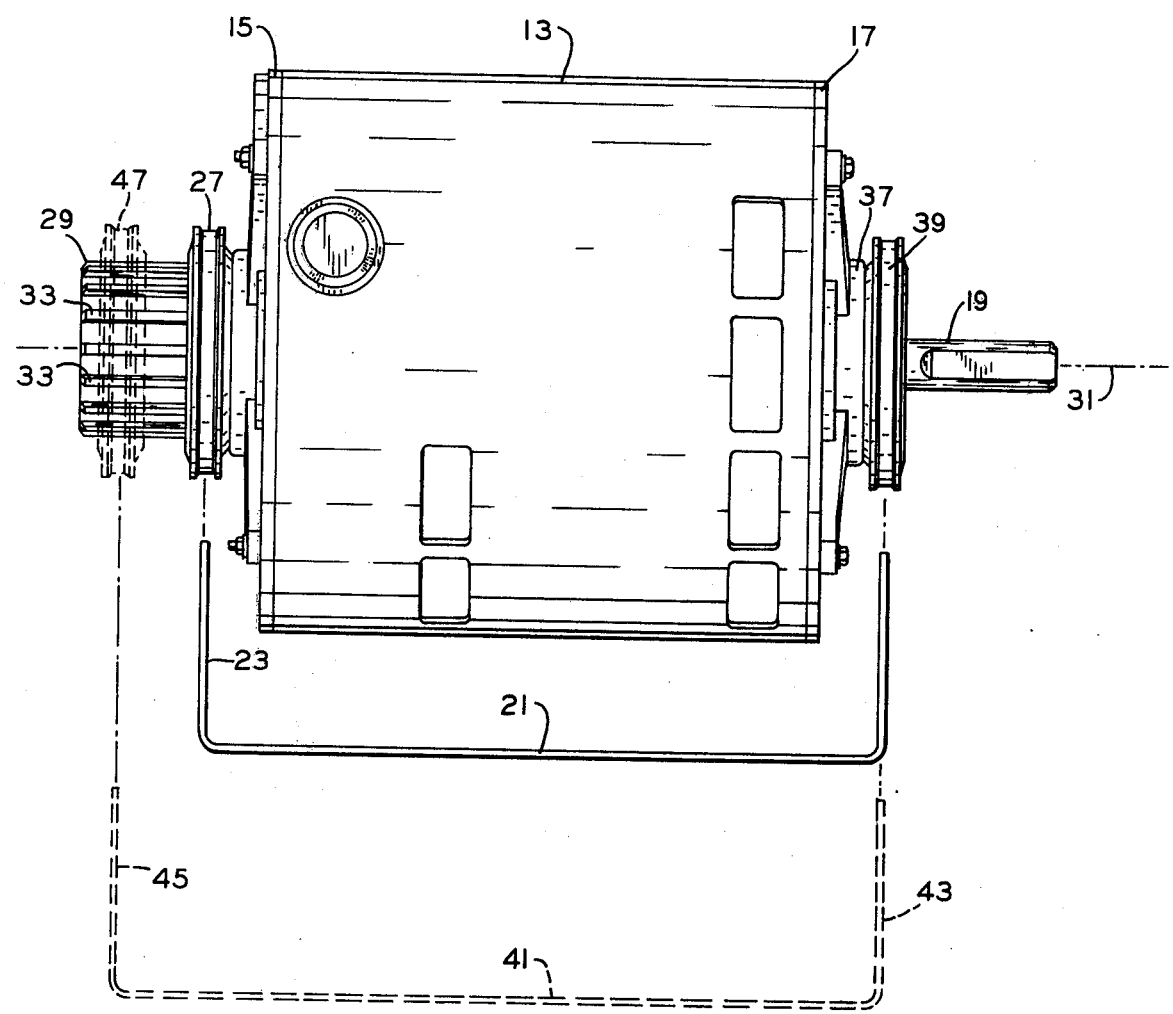
FIG. 2 is a side view of the motor of FIG. 1, illustrating alternate alignment with cradle bases of differing axial length.

The resilient mounting arrangement for the rotating machine 11 illustrated in FIG. 2 includes the pair of opposed end shields 15 and 17 with hubs 29 and 37 extending therefrom in opposite directions and generally along the machine axis 31. A resilient annulus 39 conforms to the peripheral surface of hub 37 and may be axially fixed relative to that hub 37. The other resilient annulus 27 has its interior conforming to the periphery of hub 29 and is, as previously described, axially movable along that surface to vary the axial separation between the two resilient annuli to thereby accommodate differing machine mounting brackets such as 21 and 41. As previously described, the periphery of hub 29 and the resilient annulus 27 include mating deviations from a circular configuration so as to prevent rotation of that annulus relative to the second hub 29 and these deviations may include splines on the hub 29 and corresponding axially extending grooves along the annular interior. Other deviations from a circular configuration could of course be employed such as forming the hub in a polygonal shape or forming that hub with grooves and the ring with interior mating projections and even a simple keyway in each of the hub and ring along with a key interconnecting the two members could be employed.

Adapting the mounting arrangement illustrated in FIG. 2 to a selected one of a plurality of different size cradle bases should now be readily understood. The axial separation between the cushion rings 27 and 39 is appropriate for engagement with the cradle base 21 as illustrated, however, if it is desired to support the motor in cradle base 41, the cushion ring or mounting member 27 is axially displaced on its pertaining hub 29 to position the mounting members or rings 39 and 27 axially in alignment with the respective extremities of the arms 43 and 45 of cradle base 41. The mounting members 39 and 27 with ring 27 now in the position illustrated in dotted lines as 47 are juxtaposed with the respective arm extremities and the mounting members secured to those arms. The respective arms 43 and 45 extend generally parallel to one another and the axial separation between these two arms varies from manufacturer to manufacturer. The hub 29 extends from the motor end shield 15 for about one and one-half inches while the width of the annulus 27 in the direction of the axis 31 is about three-eighths of an inch thereby allowing the motor mounting arrangement to accommodate cradle bases varying in length by as much as one and one-eighth inches. The particular contour of the cradle portion of arms such as 43 and 45 is also variable among manufacturers, being typically a radius of curvature which is circular and adapted to cushion ring diameters of either two and one-quarter or two and one-half inches. The securing of the mounting members to their respective arms as well as the adapting of the mounting members to varying radii of curvature in the cradle portion is illustrated in FIG. 3.

Figure 3:
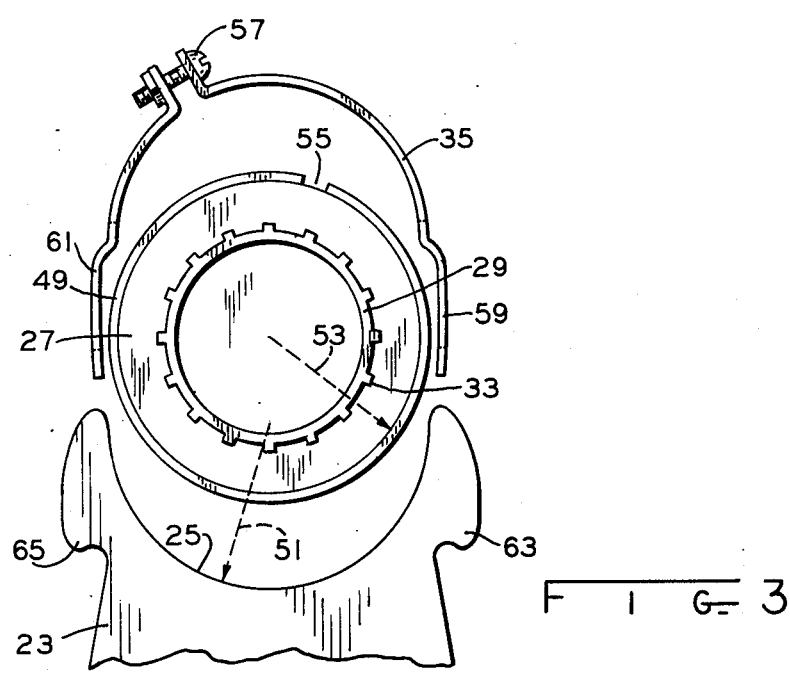
FIG. 3 is an end view illustrating the manner of clamping one cushion ring to the cradle portion of the mounting base of FIG. 1.

In FIG. 3 an annular filler strip 49 is employed to conform the base arm 23 radius of curvature 51 to the radius of curvature 53 of the cushion ring 27. This annular filler strip 49 provides further adaptability of the mounting arrangement of the present invention and may be slotted, for example at 55, to collapse somewhat when the clamping band 35 urges the filler strip 49 into engagement with arm 23 and annulus 27. The clamping band 35 may be in two parts joinable by a tightening screw 57 with each part including a slot 59 and 61 which may be hooked over corresponding tangs or projections 63 and 65 whereupon the tightening screw 57 is tightened to securely clamp the cushion ring 27 to the arm 23. An arrangement as illustrated in FIG. 3 may be used at each motor end for clamping both cushion ring 27 and cushion ring 39 firmly in the cradle base.

From the foregoing it is now apparent that a novel method and apparatus for supporting a motor having cradle engageable rings at opposite ends in the arms of a selected one of a plurality of different size cradle bases has been presented meeting the objects and advantageous features set out hereinbefore as well as others. Modifications may be made by those having ordinary skill in the art without departing from the spirit of the invention or the scope thereof as illustrated by the claims which follow.

What is claimed is:

1. The method of supporting a motor having cradle engageable rings each mounted on a hub at opposite ends thereof in the arms of a selected one of a plurality of different size cradle bases comprising the steps of:
    sliding at least one of the cradle engaging rings axially along the motor hub until the separation between the rings is appropriate for positioning the motor adjacent the selected base with the rings in registry with corresponding base arms;
    engaging the base arms with the corresponding rings; and
    securing the rings to the base.

2. The method of claim 1 wherein the step of engaging includes providing an annular filler strip to conform the radius of a circular ring and the radius of a circular segment of a base arm mating with the ring.

3. The method of claim 1 wherein the step of securing includes clampingly engaging the periphery of each ring.

4. The method of mounting an electric motor having resilient mounting members disposed on motor end shield hubs at opposite motor ends generally coaxial with the motor rotor axis in a support bracket having generally parallel extending arms, the extremities of which are contoured to mate with the mounting members comprising the steps of:
    axially displacing one of the mounting members on the pertaining hub to position the mounting members axially in alignment with their respective arm extremities;

juxtaposing the mounting members and their respective arm extremities; and securing the mounting members to their respective arms.

5. The method of claim 4 wherein the step of juxtaposing includes providing an adapter strip about the periphery of each mounting member to accommodate the member to the corresponding arm extremity contour.

6. The method of claim 4 wherein the step of securing includes clamping the mounting members to their respective arms.

7. The method of claim 6 wherein the step of clamping includes for each mounting member: providing a clamping band, passing that band from an arm extremity around the mounting member and back to the arm extremity, and tightening the clamping band about the mounting member to firmly urge the mounting member into engagement with the corresponding contoured arm extremity.

8. A resilient mounting arrangement for a rotating machine having a pair of opposed end shields with hubs axially extending therefrom in opposite directions comprising:

a first resilient annulus having an interior conforming to a first hub peripheral surface;

a second resilient annulus having an interior conforming to the second hub peripheral surface and axially movable along that surface to vary the axial separation of the resilient annuli to accommodate differing machine mounting brackets.

9. The mounting arrangement of claim 8 wherein the second hub periphery and second resilient annulus interior include mating deviations from circular for preventing rotation of the second annulus relative to the second hub.

10. The mounting arrangement of claim 9 wherein the deviations comprise splines on the second hub and corresponding axially extending grooves along the annulus interior.

11. The mounting arrangement of claim 8 wherein the first resilient annulus is axially fixed relative to the first hub.

12. The mounting arrangement of claim 8 further including first and second adapter rings selectively disposable about the outer periphery of the respective annuli to provide further mounting bracket adaptability.

13. An electric motor having a frame with an axially extending hub, a ring embracing the hub, the ring and hub including mating portions for allowing axial movement of the ring on the hub while preventing relative rotation of the ring and hub, a support base with a cradle portion for engaging the ring to support the hub, and means for securing the ring to the cradle portion.

14. The electric motor of claim 13 further comprising means connecting the motor frame and the support base for precluding further relative axial movement between the ring and hub.

15. The electric motor of claim 13 wherein the ring includes an inner annular resilient member and an outer annular adapter member, the adapter member being selectively removable to conform the ring to a cradle portion having a lesser radius of curvature.

16. In a resiliently mounted motor, a motor end shield having an axial extending hub, a mounting ring embracing the hub and movable axially therealong, a support base with a cradle portion for engaging the mounting ring to support the hub, means for securing the ring to the cradle portion, and means connecting the motor and the support base for fixing the relative axial position of the ring and hub at a preferred location and precluding further axial motion therebetween.

17. The mounted motor of claim 16 including means associated with the ring and hub for preventing relative rotation therebetween.

18. The mounted motor of claim 16 wherein the ring includes an inner annular resilient member and an outer annular adapter member, the adapter member being selectively removable to conform the ring to a cradle portion having a lesser radius of curvature.

19. The mounted motor of claim 16 wherein the support base includes a second cradle portion and the motor has a second end shield with an axially extending hub, the means connecting comprising a second mounting ring embracing and axially fixed to the second end shield hub, and means securing the second mounting ring to the second cradle portion.

* * * * *

UNITED STATES PATENT AND TRADEMARK OFFICE
CERTIFICATE OF CORRECTION

PATENT NO. : 4,116,410
DATED : September 26, 1978
INVENTOR(S) : John H. Boyd, Jr. and Don C. Nelson, Jr.

It is certified that error appears in the above—identified patent and that said Letters Patent are hereby corrected as shown below:

Col. 2, line 13, change "electrical" to --electric--.
Col. 3, line 41, change "annular" to --annulus--.
Col. 6, line 22, change "axial" to --axially--.

Signed and Sealed this

First Day of May 1979

[SEAL]

Attest:

RUTH C. MASON
Attesting Officer

DONALD W. BANNER
Commissioner of Patents and Trademarks